(12) United States Patent
Xu

(10) Patent No.: US 8,249,388 B2
(45) Date of Patent: Aug. 21, 2012

(54) IDENTIFYING PORTIONS OF AN IMAGE FOR CROPPING

(75) Inventor: Lejie Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 940 days.

(21) Appl. No.: 12/277,203

(22) Filed: Nov. 24, 2008

(65) Prior Publication Data

US 2010/0128986 A1    May 27, 2010

(51) Int. Cl.
*G06K 9/36* (2006.01)
(52) U.S. Cl. ............................ 382/282; 382/289
(58) Field of Classification Search .................. 382/282, 382/289, 118
See application file for complete search history.

(56) References Cited

U.S. PATENT DOCUMENTS

| | | | |
|---|---|---|---|
| 5,297,032 A | 3/1994 | Trojan et al. | |
| 5,321,750 A | 6/1994 | Nadan | |
| 5,339,392 A | 8/1994 | Risberg et al. | |
| 5,781,665 A | 7/1998 | Cullen et al. | |
| 5,819,284 A | 10/1998 | Farber et al. | |
| 5,959,621 A | 9/1999 | Nawaz et al. | |
| 6,188,405 B1 | 2/2001 | Czerwinski et al. | |
| 6,216,141 B1 | 4/2001 | Straub et al. | |
| 6,278,448 B1 | 8/2001 | Brown et al. | |
| 6,311,058 B1 | 10/2001 | Wecker et al. | |
| 6,449,638 B1 | 9/2002 | Wecker et al. | |
| 6,456,334 B1 | 9/2002 | Duhault | |
| 6,510,553 B1 | 1/2003 | Hazra | |
| 6,724,403 B1 | 4/2004 | Santoro et al. | |
| 6,832,355 B1 | 12/2004 | Duperrouzel et al. | |
| 6,976,210 B1 | 12/2005 | Silva et al. | |
| 7,028,264 B2 | 4/2006 | Santoro et al. | |
| 7,034,848 B2 | 4/2006 | Sobol | |
| 7,162,102 B2 | 1/2007 | Cahill et al. | |
| 7,376,907 B2 | 5/2008 | Santoro et al. | |
| 7,933,632 B2 | 4/2011 | Flynt et al. | |
| 7,987,431 B2 | 7/2011 | Santoro et al. | |
| 2003/0191756 A1* | 10/2003 | Oh | 707/3 |
| 2005/0104897 A1 | 5/2005 | Walker et al. | |
| 2006/0064716 A1 | 3/2006 | Sull et al. | |
| 2006/0072847 A1 | 4/2006 | Chor et al. | |
| 2006/0190833 A1 | 8/2006 | SanGiovanni et al. | |
| 2006/0279640 A1* | 12/2006 | Matsuzaka et al. | 348/222.1 |
| 2007/0076979 A1 | 4/2007 | Zhang et al. | |

(Continued)

FOREIGN PATENT DOCUMENTS

WO    9926127 A1    5/1999

OTHER PUBLICATIONS

"A Square Image" (Retrieved Sep. 15, 2008). Webpage Available at: http://www.trivista.com/products/asquareimage/ASquareImage.htm.

(Continued)

*Primary Examiner* — Jon Chang

(57) ABSTRACT

Cropping images while retaining the relevant portions of the images. The images are cropped based on an orientation of the images. For the images having a portrait orientation, the images are cropped outside a region defined by a parallelogram centered along a golden section line. For the images having a landscape orientation, the images are cropped outside a region defined by a parallelogram centered along a midpoint line. In some embodiments, the images are cropped into squares for display on a mobile computing device having a 16:9 aspect ratio.

19 Claims, 7 Drawing Sheets

U.S. PATENT DOCUMENTS

| | | | |
|---|---|---|---|
| 2007/0236762 A1* | 10/2007 | Tsuji | 358/537 |
| 2008/0019574 A1 | 1/2008 | Scalise et al. | |
| 2008/0134094 A1* | 6/2008 | Samadani et al. | 715/838 |
| 2008/0181512 A1* | 7/2008 | Gavin et al. | 382/209 |
| 2009/0208118 A1* | 8/2009 | Csurka | 382/228 |
| 2011/0225547 A1 | 9/2011 | Fong et al. | |

OTHER PUBLICATIONS

Suh, et al., "Automatic Thumbnail Cropping and its Effectiveness", UIST, 2003. 10 Pages.

"Magic Gallery Photo Features", (Retrieved Sep. 15, 2008). Webpage Available at: http://www.raizlabs.com/magic/features.asp.

* cited by examiner

US 8,249,388 B2

IDENTIFYING PORTIONS OF AN IMAGE FOR CROPPING

BACKGROUND

Photographs and other images are available in various aspect ratios. For example, many images have a 4:3 aspect ratio, while widescreen images have a 16:9 aspect ratio. To convert images from one aspect ratio to another or display images of one aspect ratio in an area with another aspect ratio, some existing systems stretch or distort the images, or add extra space around the images. Other systems unintelligently crop the image to fit within the desired aspect ratio. For example, some systems crop portions of the images outside of a center region of the images. This often eliminates important portions of the images, leaving resulting images that are not aesthetically pleasing and do not accurately represent the original images. Further, when aggregating (e.g., "tiling") a plurality of images converted or displayed according to existing systems, the resulting image combination is difficult to review.

SUMMARY

Embodiments of the invention crop images while retaining a relevant portion of the images. Image data for the images is accessed, and the orientation of each of the images is determined. The images are cropped based on the orientation. For the images having a portrait orientation, the images are cropped outside a region defined by a parallelogram centered along a golden section line. For the images having a landscape orientation, the images are cropped outside a region defined by a parallelogram centered along a midpoint line. If edge detection is available, the images are cropped based on the detected edges and the orientation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
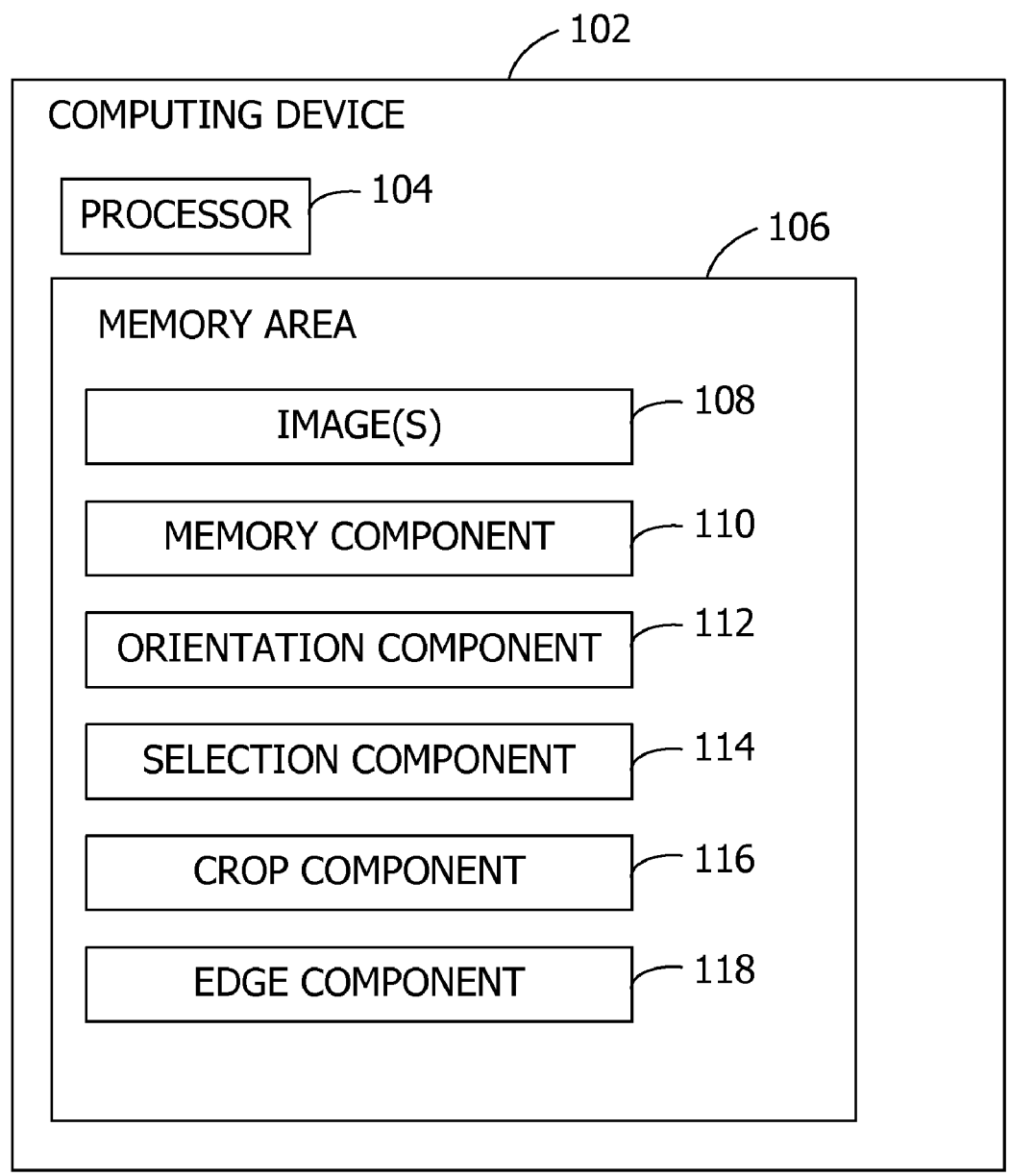
FIG. 1 illustrates an exemplary block diagram illustrating a computing device storing computer-executable components for cropping images.

Referring to FIG. 1, an exemplary block diagram illustrates a computing device 102 storing computer-executable components for cropping images 108. In some embodiments, the images 108 are cropped into square thumbnails so that the thumbnails may be combined to fill a letterbox or rectangle having a 4:3 or 4:2 aspect ratios. The letterbox is applicable for widescreen displays, such as those available on mobile computing devices 402.

The computing device 102 includes a processor 104 and a memory area 106. The memory area 106 stores a plurality of images 108, such as substantially rectangular images. Each of the plurality of substantially rectangular images has two short sides and two long sides. The memory area 106 also stores one or more computer-executable components such as a memory component 110, an orientation component 112, a selection component 114, a crop component 116, and an edge component 118. The memory component 110 accesses one or more images 108 stored in the memory area 106. The orientation component 112 determines an orientation of each of the plurality of images 108 accessed by the memory component 110. For example, the determined orientation includes portrait orientation or landscape orientation. In some embodiments, portrait orientation refers to images 108 where the height (e.g., vertically) is greater than the width (e.g., horizontally) and landscape orientation refers to images 108 where the width (e.g., horizontally) is greater than the height (e.g., vertically). The orientation information may be determined by, for example, obtaining the orientation information from the bitmap image file for the image 108. The orientation may be determined by, for example, examining metadata associated with the images 108. The metadata may explicitly indicate the orientation, indicate an aspect ratio, provide height and width dimensions, or provide upside and downside information. Alternatively, the orientation may be determined dynamically by examining the numbers of rows and columns of pixels in each of the images 108. In embodiments in which face detection logic is available, the orientation may be determined by identifying the orientation of one or more faces in the images 108. The orientation information may be stored in a database or other memory area of the computing device 102. The selection component 114 identifies a portion of each of the images 108 for display based on the orientation of the images 108 determined by the orientation component 112. For images 108 having a portrait orientation, the selection component 114 identifies the image portion as a shape approximately centered about a golden section line (see FIG. 2). The golden section line is a line dissecting each of the images 108 along the image height (e.g., vertically) at a point corresponding approximately to the golden ratio, as calculated from the bottom of the image 108. The golden section line is approximately parallel to the short sides of the image 108.

The golden ratio is described in the art with reference to a line segment divided into two segments (e.g., a longer segment A and a shorter segment B). The golden ratio represents the ratio of the length of A+B to the length of A, which is equivalent to the ratio of the length of A to the length of B. In embodiments, the ratio is geometric relationship expressed as a mathematical constant 1.6180339887. The golden ratio is also known as the "perfect number phi" in many areas of the visual and auditory sciences.

Figure 2:
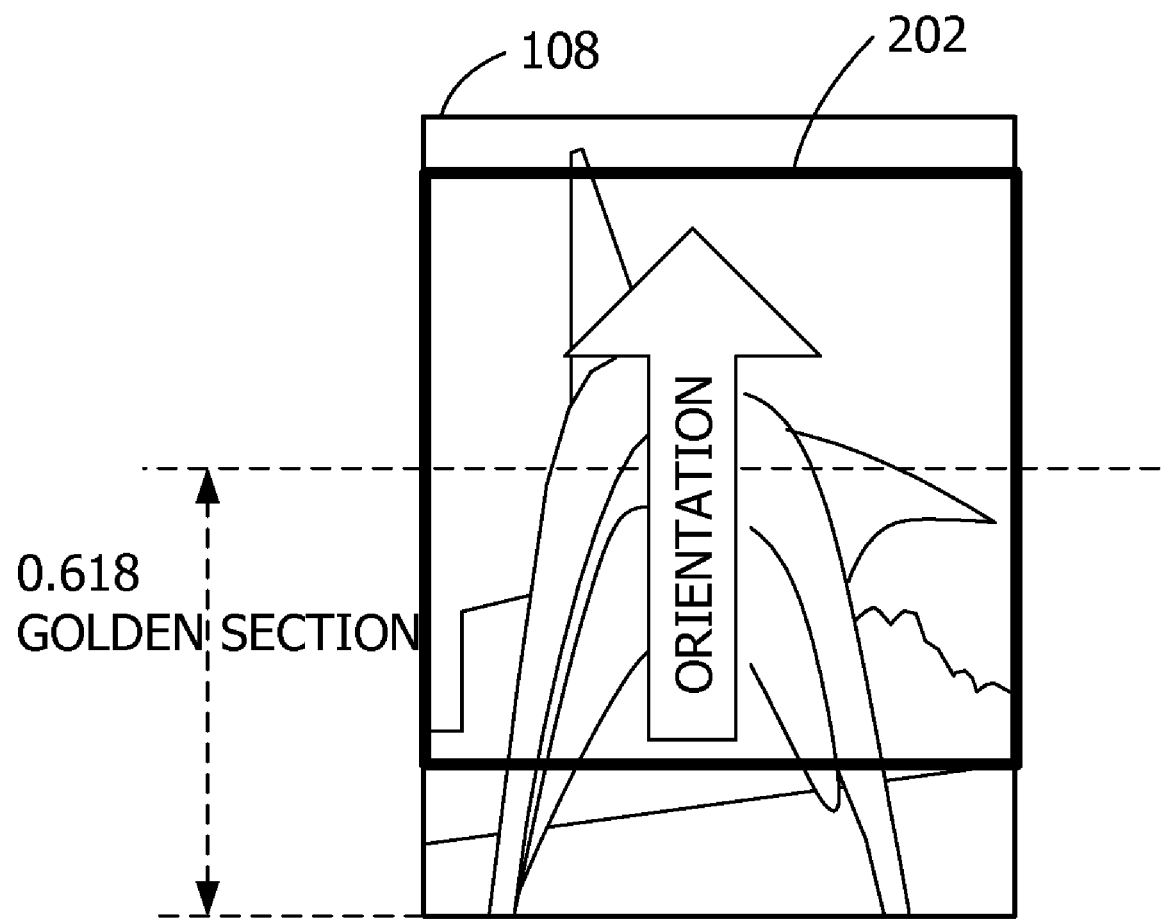
FIG. 2 illustrates an exemplary image having a portrait orientation being cropped.

In the example of FIG. 2, if the bottom of the image 108 is zero and the top of the image 108 is one, the golden section line dissects the image 108 at the point 0.6180339887 along either of the long sides of the image 108 as measured from the bottom of the image 108. Further, with the shape in FIG. 2 being a square 202, the determined golden section line approximately bisects the defined square.

While the shape illustrated in FIG. 2 is the square 202, any shape and orientation of the shape is contemplated. For example, the shape includes polygons and ellipses. The polygons may be regular (e.g., rectangles, squares, or parallelograms) or irregular. The ellipses may be regular (e.g., circles) and irregular. In generally, aspects of the invention contemplate any shape.

Further, while the square 202 illustrated in FIG. 2 spans the width of the image 108 (e.g., the length of the side of the square approximately equals the length of the short sides), the square 202 may span a portion of the image 108. For example, the square 202 may be scaled larger or smaller than the square 202 illustrated in FIG. 2. Additionally, while the position of the golden section line is determined relative to, or measured from, the bottom of the image 108, other embodiments contemplate the golden section line being determined relative to the top of the image 108.

Figure 3:
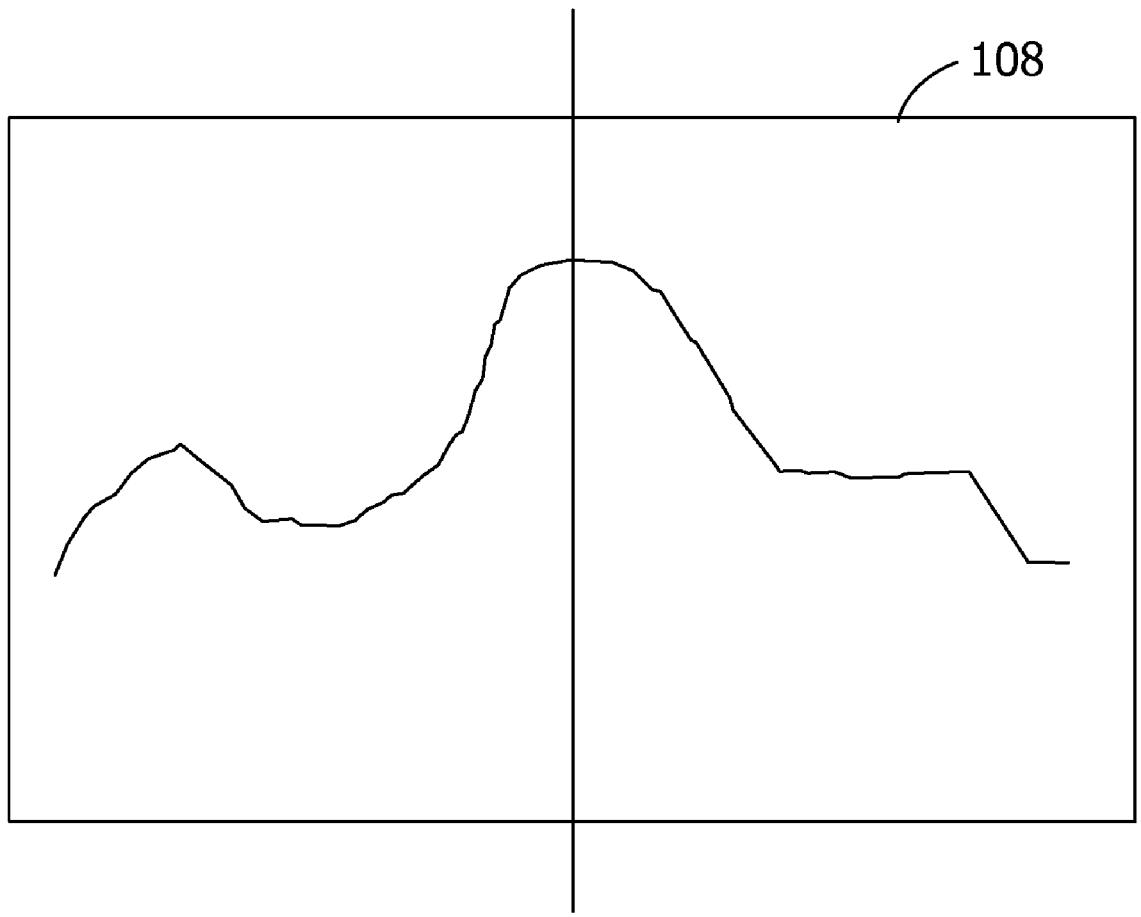
FIG. 3 illustrates an exemplary image having a landscape orientation being cropped.

For the images 108 having a landscape orientation, the selection component 114 identifies the image portion as a shape that is approximately centered within the images 108 along an approximate midpoint line (see FIG. 3). The midpoint line spans at least a portion of each of the images 108 and is approximately parallel to the long sides of the images 108. In some embodiments, the midpoint line divides the images 108 into two substantially equal image portions (e.g., a bisection). The midpoint line is determined by identifying a midpoint along the long side of the image 108, and drawing a line spanning the image 108 at the identified midpoint. In the example of FIG. 3, the shape is a square within the image 108, and the midpoint line approximately bisects the square.

The crop component 116 extracts the portion of each of the images 108 as identified by the selection component 114. The portions of each image 108 outside the identified portion are removed. The extracted portion serves as a relevant, representative thumbnail image of the original image 108. With the components illustrated in FIG. 1, the thumbnail images are created without stretching, squishing, or otherwise distorting the original aspect ratio of each of the images 108.

In some embodiments, the edge component 118 detects one or more objects in the images 108. For example, face detection logic is known as one form of object detection in the art. Existing face detection algorithms employ a variety of means to determine the presence of one or more faces in the images 108. For example, some existing algorithms use edge detection algorithms to identify the contours in the images 108, and then compare contours to typical contours of human faces. In these embodiments, the selection component 114 identifies the image portion to extract by centering the shape over the face. If there is a plurality of faces detected, the selection component 114 scales the shape to include or encompass all the faces and centers the shape relative to the detected faces, in some embodiments.

Figure 4:
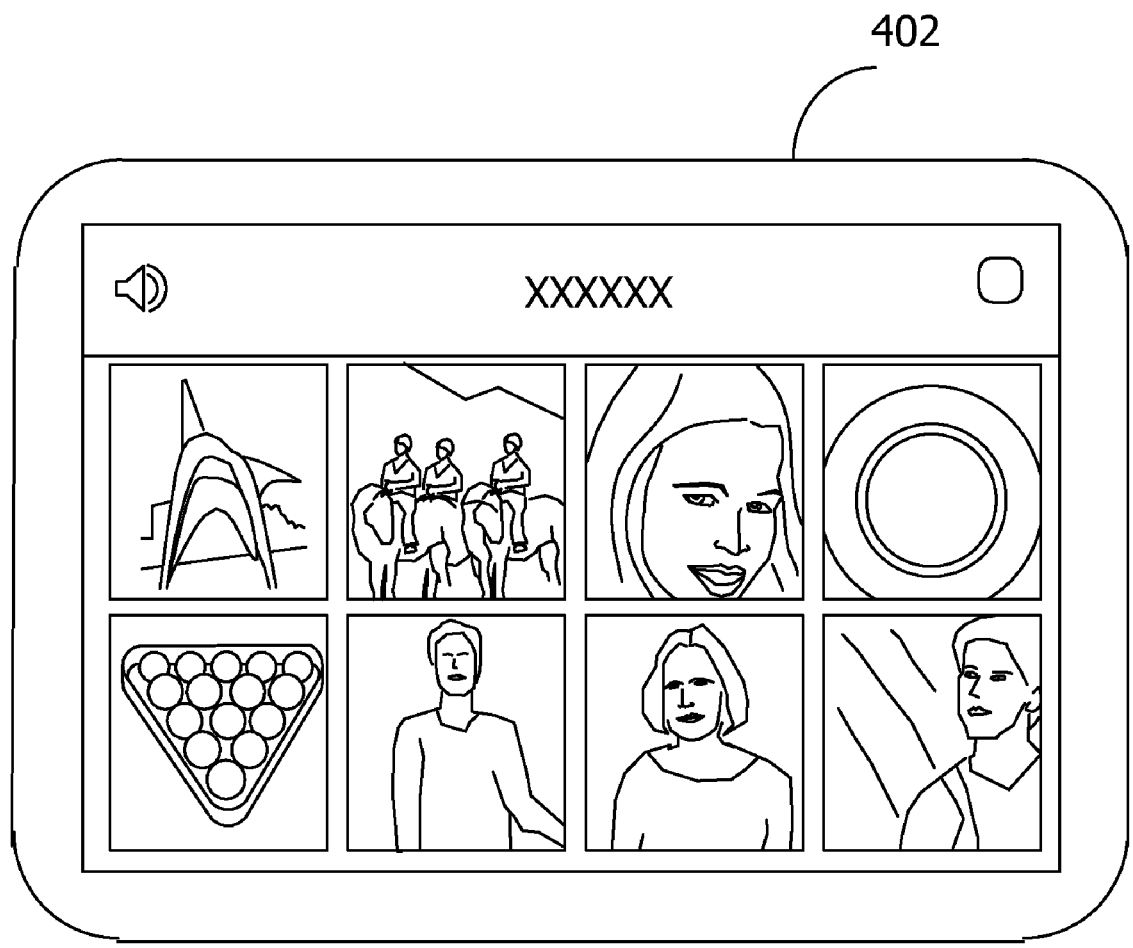
FIG. 4 illustrates an exemplary mobile computing device displaying square-cropped thumbnail images in a grid-pattern.

Referring next to FIG. 4, an exemplary mobile computing device 402 displays square-cropped thumbnail images in a grid or mosaic pattern. In the example of FIG. 4, a user wishes to review, search, and/or select images 108 stored on the mobile computing device 402. The thumbnail images in FIG. 4 represent the output of execution of the components illustrated in FIG. 1, and/or the results of the execution of the operations illustrated in FIG. 5 and/or FIG. 6. The thumbnail images are arranged to be substantially adjacent the display.

While the example of FIG. 4 illustrates square thumbnails, embodiments of the invention contemplate any shape for the thumbnails. For example, the thumbnails may be diamonds, rectangles, triangles, circles, tabs, or irregular polygons that "lock" into one another to maximize the display area (e.g., minimize space between the images).

As many mobile computing devices 402 have a display capable of displaying images 108 in both 4:3 aspect ratio and 16:9 aspect ratio, embodiments of the invention enable the creation of the thumbnail images for the purpose of aggregating or combining the thumbnail images to maximize the available display area. In this manner, the user is presented with a maximum amount of content for review without having to scroll or advance through pages of images unnecessarily. Further, the relevant portions of the images are identified enabling the user to quickly identify or recognize the contents of a particular image (e.g., when searching for a particular image). The user is also able to review the images without having to scale or zoom any one of the particular images as the thumbnails are an accurate representation of the original corresponding images 108.

While aspects of the invention are described with reference to the computing device 102 being the mobile computing device 402 such as a mobile telephone, embodiments of the invention are operable with any computing device configured to display the images 108. For example, aspects of the invention are operable with devices such as laptop computers, gaming consoles, hand-held or vehicle-mounted navigation devices, portable music players, and other devices.

Figure 5:
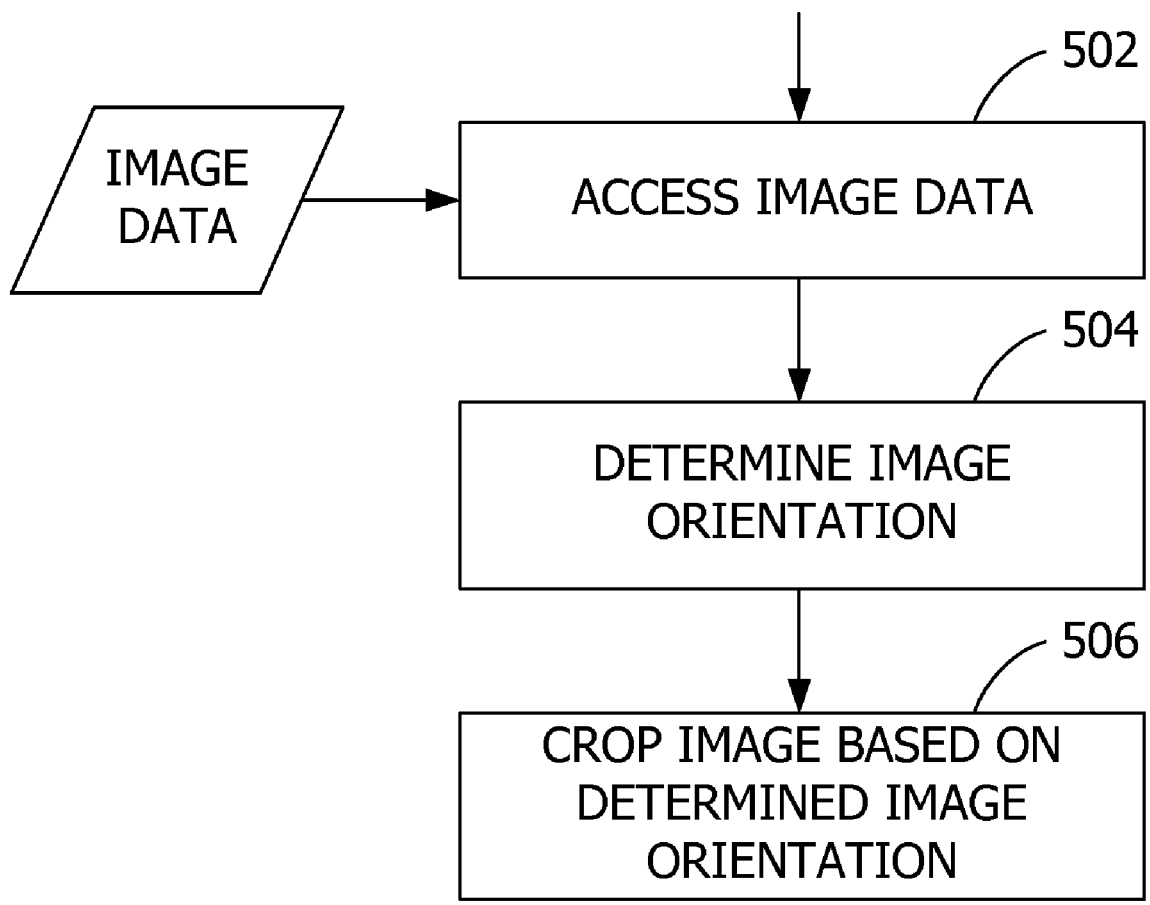
FIG. 5 illustrates an exemplary flow chart illustrating the cropping of images based on orientation of the images.

Referring next to FIG. 5, an exemplary flow chart illustrates the cropping of images 108 based on orientation of the images 108. The operations illustrated in FIG. 5 and FIG. 6 may be performed by the mobile computing device 402 or any other computing device 102 operating on one or more of the images 108 stored locally or remotely from the mobile computing device 402. In some embodiments, a web service accesses the images 108 stored on the mobile computing device 402 (or on a remote storage area), performs the cropping, and provides the thumbnail images to the mobile computing device 402 for display to the user.

Image data for the images 108 (e.g., pixel data and/or metadata describing the images 108) is accessed at 502. The orientation of each of the images 108 is determined at 504 based on the accessed image data. The images 108 are cropped at 506 based on the determined image orientation. As an example, the operations at 502, 504, and 506 may be performed for one image 108 at a time, or the operations may each be performed for a plurality or all of the images 108, or any combination thereof. For example, the image data for all the images 108 may be accessed, while the orientation determination and cropping subsequently occurs for each of the images 108.

Figure 6A:
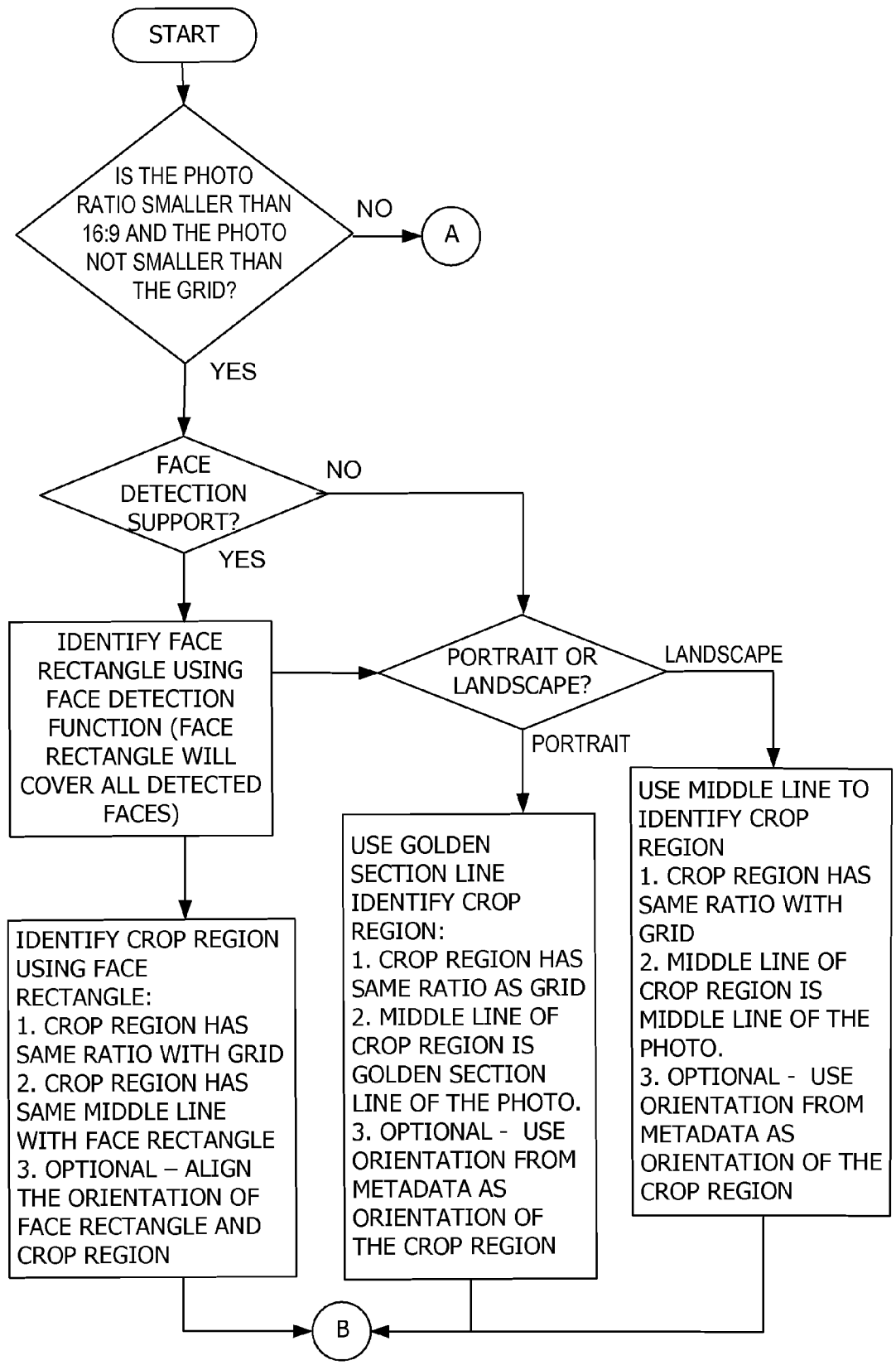
FIG. 6A and FIG. 6B illustrates an exemplary flow charts illustrating the cropping of images based on orientation of the images and available resources such as face detection logic.
Figure 6B:
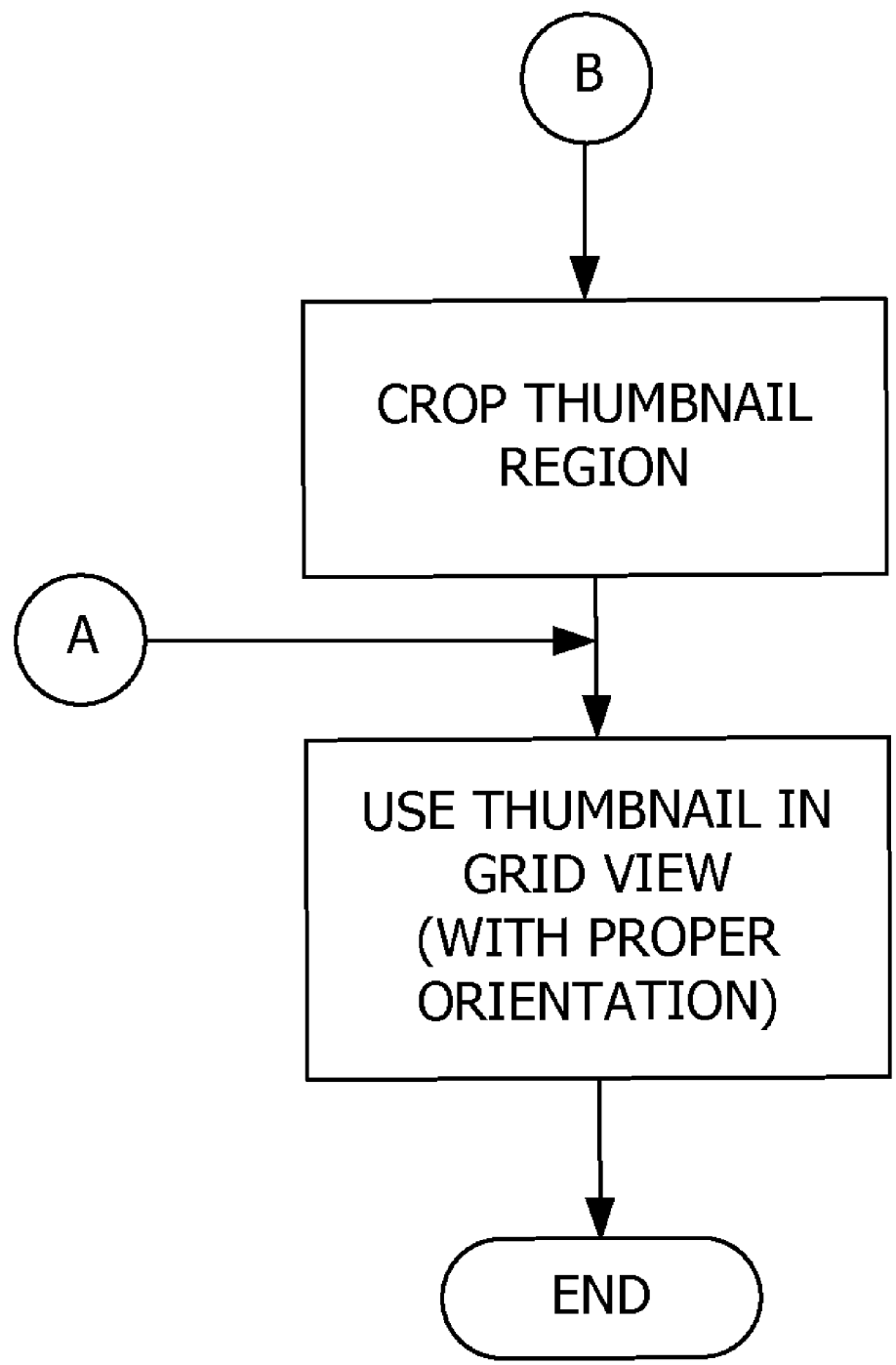

Referring next to FIG. 6A and FIG. 6B, exemplary flow charts illustrates the cropping of images 108 based on orientation of the images 108 and available resources such as face detection logic. In this example, the images 108 are photographs, and the goal is to create thumbnails for display on a grid (e.g., a letterbox grid). Further in this example, the orientation of the crop region is optionally determined by metadata describing the orientation of the image 108. Further, if the original image 108 has an aspect ratio greater than 16:9, the image 108 is not cropped in some embodiments. Rather, the image 108 is scaled to the thumbnail size and shape. Similarly, for small pictures, if the long side of the image 108 is shorter than the desired grid size, the image 108 is not cropped.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for cropping the images 108 to obtain a relevant portion of the images 108, and exemplary means for identifying a relevant portion of the images 108 based on the orientation and for automatically cropping the images 108 to obtain a letter-box ratio of the relevant portion.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for cropping images to create thumbnail images for aggregate display, said system comprising:
   a memory area for storing a plurality of rectangular images, wherein each of the plurality of rectangular images has a short side and a long side; and
   a processor programmed to:
      create thumbnail images corresponding to at least two of the plurality of images stored in the memory area by:
         determining an orientation of the image, said determined orientation comprising portrait orientation or landscape orientation;
         if the determined orientation corresponds to the portrait orientation:
            identifying a point along the long side of the image, said identified point corresponding to an approximate golden ratio measured from the short side of the image;
            determining a golden section line spanning the image at the identified point and approximately parallel to the short side of the image;
            defining a square within the image, wherein the determined golden section line approximately bisects the defined square; and
            cropping the image outside the defined square to create one of the thumbnail images; and
         if the determined orientation corresponds to the landscape orientation:
            identifying a midpoint along the long side of the image;
            determining a line spanning the image at the identified midpoint;
            defining a square within the image, wherein the determined line approximately bisects the defined square; and
            cropping the image outside the defined square to create one of the thumbnail images; and
      arrange the created thumbnail images to be substantially adjacent for display.

2. The system of claim 1, wherein the short side of the image corresponds to a bottom of the image if the determined orientation corresponds to the portrait orientation.

3. The system of claim 1, wherein the arranged thumbnail images represents a mosaic of the plurality of images.

4. The system of claim 1, wherein the processor is configured to arrange the created thumbnail images by arranging the created thumbnail images for display on a mobile computing device.

5. The system of claim 1, further comprising means for cropping the images to obtain a relevant portion of the images.

6. The system of claim 1, further comprising means for identifying a relevant portion of the images based on the orientation and for automatically cropping the images to obtain a letterbox ratio of the relevant portion.

7. A method comprising:
   accessing image data for a plurality of images, wherein each of the plurality of images has a short side and a long side;
   determining an orientation of each of the images based on the accessed image data, said determined orientation comprising portrait orientation or landscape orientation; and
   cropping one or more of the images based on the determined orientation, wherein cropping one or more of the images comprises:

for each of the one or more images having the portrait orientation, approximately centering a shape within the image along an approximate golden section line and cropping the image outside the centered shape, said golden section line spanning the image and being approximately parallel to a short side of the image; and for each of the one or more images having the landscape orientation, approximately centering a shape within the image approximately along a midpoint line and cropping the image outside the centered shape, said midpoint line spanning the image and being approximately parallel to a long side of the image.

8. The method of claim 7, wherein cropping one or more of the images comprises cropping one or more of the images to create one or more thumbnail images.

9. The method of claim 8, further comprising arranging the created thumbnail images to be substantially adjacent for display.

10. The method of claim 7, wherein accessing the image data comprises accessing metadata describing the images.

11. The method of claim 7, wherein centering the shape within the image approximately along the golden section line comprises:

defining the golden section line to include a point corresponding approximately to the golden ratio, said golden ratio being calculated from the short side of the image; and centering the shape within the image such that the defined golden section line approximately bisects the shape.

12. The method of claim 7, further comprising detecting a face within the images and centering the shape on the detected face.

13. The method of claim 7, further comprising detecting a plurality of faces within the images and adjusting a size of the shape to encompass each of the plurality of faces.

14. The method of claim 7, wherein the short side of the image corresponds to a bottom of the image for the images having the portrait orientation.

15. One or more computer storage media having computer-executable components, said components comprising:

a memory component for accessing a plurality of images;

an orientation component for determining an orientation of each of the plurality of images accessed by the memory component, said determined orientation comprising portrait orientation or landscape orientation;

a selection component for identifying a portion of each of the images for display based on the orientation of the images determined by the orientation component, wherein the selection component identifies the portion as a parallelogram which is approximately centered within the images along an approximate golden section line for the images having the portrait orientation, said golden section line spanning the image and being approximately parallel to a short side of the images, wherein the selection component identifies the portion as a parallelogram which is approximately centered within the images along an approximate midpoint line for the images having the landscape orientation, said midpoint line spanning the image and being approximately parallel to a long side of the image; and a crop component for extracting the portion of each of the images as identified by the selection component.

16. The computer storage media of claim 15, further comprising an edge component for detecting one or more objects in the images, wherein the selection component centers the parallelogram on the objects.

17. The computer storage media of claim 15, wherein the selection component determines the approximate golden section line measured from a bottom of the images for the images having the portrait orientation.

18. The computer storage media of claim 15, wherein the crop component extracts the portion of the images without stretching the images.

19. The computer storage media of claim 15, wherein the parallelogram comprises a square, and wherein a length of the side of the square approximately equals a length of the short side.

* * * * *